(12) United States Patent
Phillips et al.

(10) Patent No.: US 9,568,089 B2
(45) Date of Patent: Feb. 14, 2017

(54) SMART SOLENOID FOR CONTROLLING FLUID FLOW

(71) Applicant: FLEXTRONICS AP, LLC, Broomfield, CO (US)

(72) Inventors: David Phillips, Coopersville, MI (US); Richard Guzorek, Rockford, MI (US)

(73) Assignee: FLEXTRONICS AP, LLC, Broomfield, CO (US)

(*) Notice: Subject to any disclaimer, the term of this patent is extended or adjusted under 35 U.S.C. 154(b) by 119 days.

(21) Appl. No.: 14/222,132

(22) Filed: Mar. 21, 2014

(65) Prior Publication Data

US 2015/0267800 A1 Sep. 24, 2015

(51) Int. Cl.

| | |
|---|---|
| *F16H 57/04* | (2010.01) |
| *F16K 31/06* | (2006.01) |
| *F01P 7/16* | (2006.01) |
| *F01P 11/14* | (2006.01) |
| *G05D 23/19* | (2006.01) |
| *F01P 7/14* | (2006.01) |
| *H01F 7/18* | (2006.01) |

(52) U.S. Cl.
CPC ........... *F16H 57/0412* (2013.01); *F01P 7/167* (2013.01); *F01P 11/14* (2013.01); *F16K 31/0644* (2013.01); *F16K 31/0675* (2013.01); *G05D 23/19* (2013.01); *H01F 7/1844* (2013.01); *F01P 2007/146* (2013.01); *F01P 2031/00* (2013.01); *H01F 2007/185* (2013.01)

(58) Field of Classification Search
CPC .............. F16H 57/0412; F16K 31/0644; F16K 31/0675; F01P 11/14; F01P 7/167; F01P 2007/146; F01P 2031/00; H01F 7/18; H01F 2007/185; H01F 7/1844; G05D 23/19

USPC ........................ 251/129.04, 129.15; 137/554
See application file for complete search history.

(56) References Cited

U.S. PATENT DOCUMENTS

| | | | |
|---|---|---|---|
| 5,012,386 A | 4/1991 | McShane et al. | |
| 6,390,036 B1 * | 5/2002 | Yuuki | F01L 9/04 251/129.16 |
| 6,705,586 B2 | 3/2004 | Williges | |
| 6,971,346 B2 * | 12/2005 | Flohr | F01L 9/04 123/90.11 |
| 6,993,424 B2 * | 1/2006 | Shim | F16H 61/0251 251/129.15 |

(Continued)

FOREIGN PATENT DOCUMENTS

| | | |
|---|---|---|
| DE | 4109498 A1 * | 9/1992 |
| WO | WO0144632 A2 | 6/2001 |

OTHER PUBLICATIONS

Hydraforce, "Efficient Electro-Hydraulic (EH) Control Solutions for Off-Highway Transmission," pp. 1-8 (2013).

*Primary Examiner* — John Bastianelli
(74) *Attorney, Agent, or Firm* — Volpe and Koenig, P.C.

(57) ABSTRACT

A solenoid fluid control valve for controlling fluid flow. The solenoid fluid control valve may comprise a transceiver that receives a signal via a controller area network (CAN) bus, and a micro controller unit that decodes the signal to determine a temperature. The micro controller unit may send a signal to a driver circuit based on the temperature. The driver circuit may send a current through a coil in response to the signal, wherein an armature moves in response to the current through the coil. The movement of the armature may direct a cooling fluid flow.

10 Claims, 7 Drawing Sheets

(56) References Cited

U.S. PATENT DOCUMENTS

| | | | |
|---|---|---|---|
| 7,165,518 B2* | 1/2007 | Ervin | F01L 9/04 |
| | | | 123/90.11 |
| 7,484,429 B2 | 2/2009 | Adams et al. | |
| 7,600,494 B2* | 10/2009 | Gale | F01L 9/04 |
| | | | 123/90.11 |
| 7,701,314 B2 | 4/2010 | Hazzard et al. | |
| 7,950,413 B2 | 5/2011 | Fleischer et al. | |
| 2006/0052905 A1* | 3/2006 | Pfingsten | H01R 9/2425 |
| | | | 323/211 |
| 2012/0097282 A1* | 4/2012 | Coombs | F15B 13/0814 |
| | | | 251/129.15 |
| 2013/0056194 A1 | 3/2013 | Cregut | |

* cited by examiner

SMART SOLENOID FOR CONTROLLING FLUID FLOW

FIELD OF INVENTION

The present invention relates to a solenoid fluid control valve used to regulate a transmission fluid temperature.

BACKGROUND

A fluid control valve may be used to regulate the temperature of an automotive device, such as an engine or transmission. Above a certain threshold, lubricating oil in the device may begin to burn, reducing the device's efficiency. Fluid control valves may be used to direct coolant for a particular device through the radiator, thereby reducing the temperature of the device.

The fluid control valve may be a mechanical valve that does not require electrical control signaling. Alternatively, the fluid control valve may be controlled by an electronic control unit (ECU) associated with the device being cooled. For example, the engine control module may control the fluid control valve for the engine coolant. In some cases, however, the device to be cooled may be far from the radiator, where the fluid control valve is likely to be located. In this case, wires may be connected from the device's ECU to the fluid control valve, such that the ECU may signal the valve to open and close. This approach adds complexity to the wiring of the system, and requires the ECU to be designed to control the fluid control valve.

SUMMARY

A solenoid fluid control valve is disclosed for controlling fluid flow. The solenoid fluid control valve may comprise a transceiver that receives a signal via a controller area network (CAN) bus, and a micro controller unit that decodes the signal to determine a temperature. The micro controller unit may send a signal to a driver circuit based on the temperature. The driver circuit may send a current through a coil in response to the signal, wherein an armature moves in response to the current through the coil. The movement of the armature may direct a cooling fluid flow.

DETAILED DESCRIPTION OF THE PREFERRED EMBODIMENTS

The controller area network (CAN) is a high speed communications bus that carries messages between electronic control units (ECUs) in an automobile. ECUs send signals to devices that they control, often via a local interconnect network (LIN). A LIN is a low cost, low speed communications bus typically used between an ECU and the devices that it monitors or controls.

Figure 1:
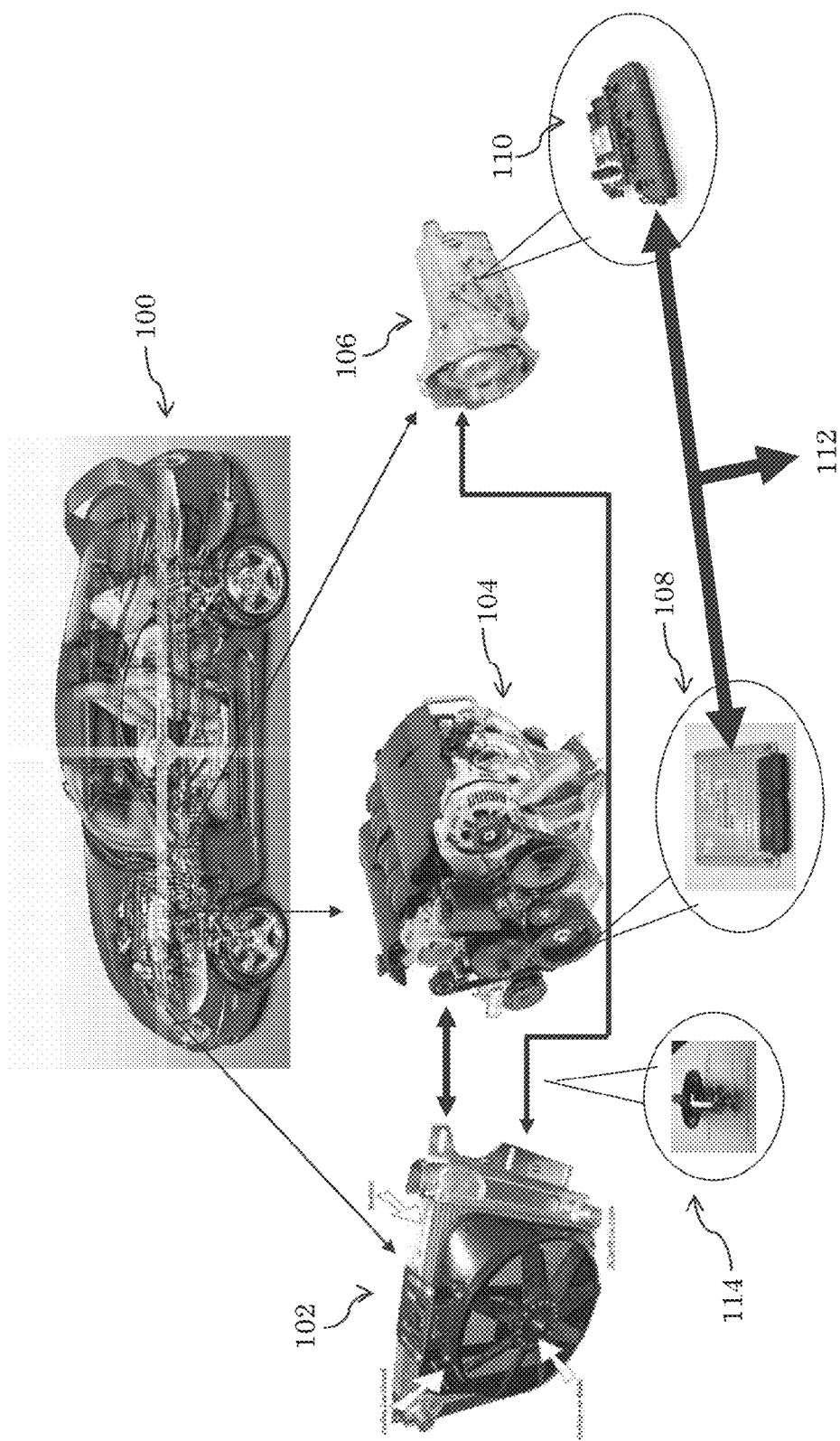
FIG. 1 shows an overview of various automotive components.

FIG. 1 shows an automobile 100 with a radiator 102, an engine 104, and a transmission 106. An engine control unit 108 may electronically control devices in the engine 104, and a transmission control unit (TCU) 110 may electronically control devices in the transmission 106. The engine control unit 108, TCU 110, and other vehicle systems may be connected to a wire harness 112. In an embodiment of the invention, the automobile 100 has a coolant line that runs between the radiator 102 and the transmission 106, which may be used to regulate the transmission temperature. The TCU 110 may monitor the temperature of the transmission 106. The TCU 110 may be mounted inside the transmission 106 or external to it.

A wax valve 114 may be used to regulate the flow of coolant from the transmission 106 to the radiator 102. The wax valve 114 may be located in the engine compartment near the radiator 102. As the temperature of the engine compartment increases, the wax in the valve melts and expands, displacing the armature. The motion of the armature may operate a rod that opens a passage for the transmission coolant to flow to the radiator. When the engine temperature drops, the wax solidifies and the passage is once again obstructed.

Because the wax valve 114 is located in the engine compartment, its state (opened or closed) is influenced by the temperature of the engine compartment, instead of depending only on the transmission oil temperature. Accordingly, it may not properly regulate the transmission oil temperature to optimize the transmission's efficiency. The wax valve may also exhibit significant hysteresis, further preventing the transmission oil from remaining within an optimal temperature range.

As an alternative to a mechanical valve such as the wax valve, an electronic valve such as a solenoid fluid control valve may be used to control the transmission cooling fluid. Solenoid valves tend to have much lower hysteresis than wax valves, and may be controlled by electrical signals from an ECU. For example, a solenoid fluid control valve used to regulate the transmission oil temperature may be in communication with the TCU 110. The TCU 110 may monitor the transmission oil temperature, and may send a signal to the solenoid when the temperature exceeds a certain value. Similar to the wax valve 114, the solenoid fluid control valve may be located in the engine compartment near the radiator. When the solenoid receives a signal from the TCU 110, it may direct the transmission coolant to the radiator 102. The TCU 110 may continue to monitor the transmission oil temperature, and when the temperature falls below a threshold value, the TCU 110 may send a second signal to the solenoid. The solenoid fluid control valve may respond to the second signal by directing the transmission coolant to bypass the radiator.

In the scenario described above, a connection is required between the TCU 110 and the solenoid fluid control valve in the engine compartment. This requires wiring between the transmission 106 and the solenoid, and also requires that the TCU 110 has input and output ports dedicated to the solenoid. The TCU 110 must also send signals to the solenoid based on the transmission oil temperature, adding to the TCU's workload.

Figure 2:
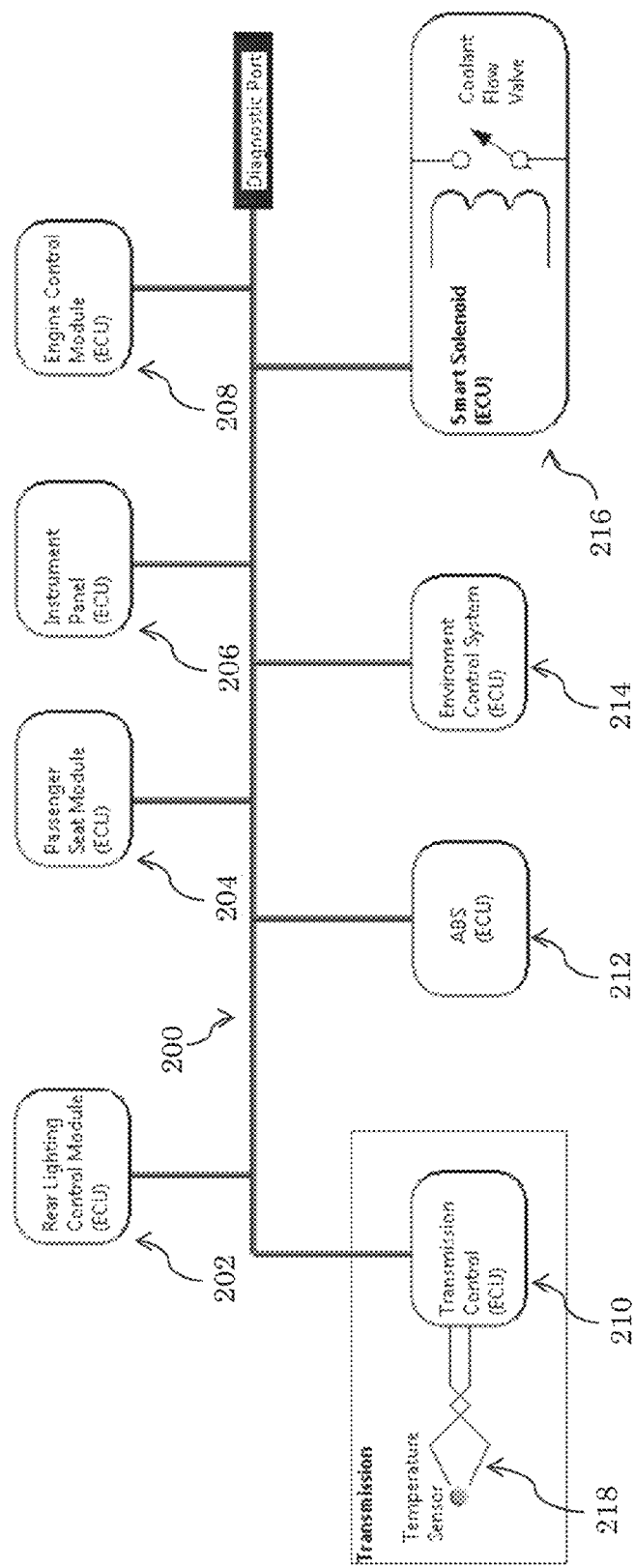
FIG. 2 illustrates a controller area network (CAN) bus connected to a number of electronic control units (ECUs)

As an alternative to the scenario above, a smart solenoid may be used to control the flow of the transmission coolant to the radiator 102. The smart solenoid may be connected directly to the automobile's controller area network (CAN) bus, and may not have a direct connection to the TCU 110. As shown in FIG. 2, the CAN bus 200 serves as a central communications bus for the car's various electronic control units (ECUs). For example, the CAN bus 200 may facilitate communications between a rear lighting control module 202, a passenger seat module 204, an instrument panel module 206, an engine control module 208, a transmission control module 210, an anti-lock braking system 212, an environment control system 214, and a smart solenoid 216. The smart solenoid 216 may listen to messages on the CAN bus 200, and may decide to open or close a fluid passage to the radiator based on the messages. As an example, the TCU 210 may include a temperature sensor 218 that may measure the transmission oil temperature. The TCU 210 may broadcast the transmission oil temperature on the CAN bus 200. The smart solenoid 216 may listen to the messages on the CAN bus 200 and receive the transmission oil temperature message. Depending on the temperature, the smart solenoid 216 may decide to open or close the fluid control valve.

Figure 3:
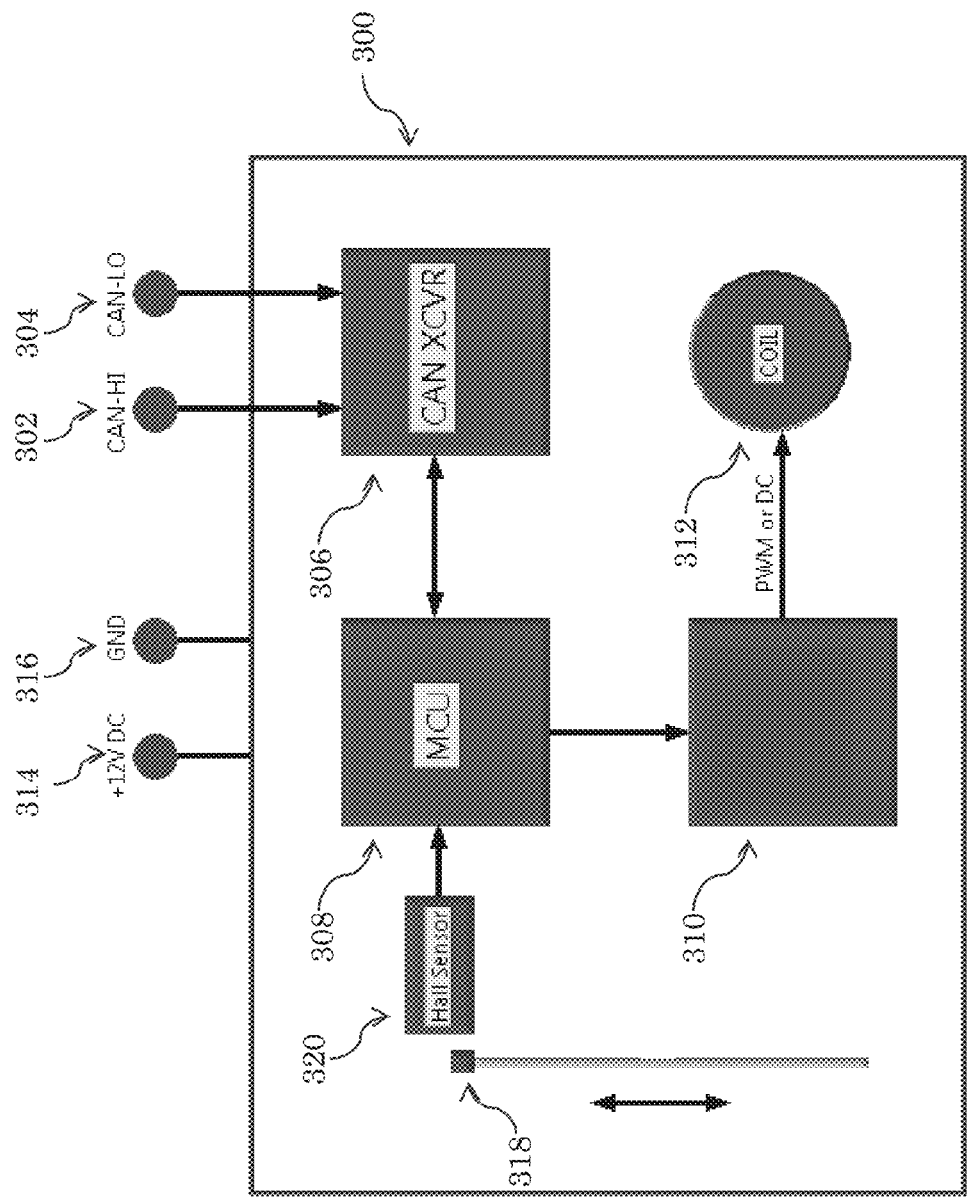
FIG. 3 shows a smart solenoid in communication with a CAN bus.

FIG. 3 shows a diagram of a smart solenoid 300 in communication with a CAN bus. The smart solenoid 300 receives signals from the CAN bus on the CAN-HI and CAN-LO terminals 302, 304. The CAN transceiver 306 forwards the signals to the micro controller unit 308. The micro controller unit 308 decodes the CAN signals and determines whether to energize the coil 312 based on the decoded signals. For example, the micro controller unit 308 may identify a transmission oil temperature message received from the CAN bus, and may decode the message to determine the current transmission oil temperature. The micro controller unit 308 may compare the current temperature to a pre-determined threshold temperature. If the transmission oil temperature is above the threshold, the micro controller unit 308 may send a signal to driver circuit 310. The driver circuit 310 may be a power metal-oxide semiconductor field-effect transistor (MOSFET), a field-effect transistor (FET), a junction gate field-effect transistor JFET, a transistor, or any other type of driving circuit. If the armature position of the de-energized coil 312 prevents the coolant from passing through the radiator, the driver circuit 310 may energize the coil 312 to divert the fluid to the radiator. The driver circuit 310 may use a pulse width modulated (PWM) signal or direct current (DC) signal to energize the coil 312. Alternatively, if the armature position of the energized coil 312 prevents the coolant from passing through the radiator, the driver circuit may de-energize the coil 312 to divert coolant to the radiator. The current to the coil 312 may be supplied by the +12V DC and ground terminals 314, 316.

Once the coil 312 is energized or de-energized, the micro controller unit 308 may continue to receive and decode messages from the CAN bus reporting the current transmission oil temperature. If the temperature drops below a predetermined threshold, the micro control unit 308 may signal the driver circuit 310 to de-energize or energize the coil 312, closing the fluid passage to the radiator. The predetermined threshold for the decreasing transmission oil temperature may be the same as that for the increasing transmission oil temperature, or may be different.

The smart solenoid 300 may be configure to only receive signals via the CAN bus. Alternatively, the smart solenoid 300 may be configured to transmit as well as receive signals. The micro controller unit 308 may prepare and encode a signal, and may transmit the signal to the CAN transceiver 306, which may then broadcast the signal over the CAN bus. The signal may be received by any control unit connected to the CAN bus, including the TCU. The signals may be used, for example, to report a malfunction of the transmission oil cooling system.

The smart solenoid may additionally include a magnet 318 and a Hall effect sensor 320. The magnet 318 may be fixed to the armature such that motion of the armature results in motion of the magnet 318. The Hall effect sensor 320 may detect the position of the magnet 318, and may report the magnet's position to the micro controller unit 308. The micro controller unit 308 may adjust the current through the coil 312 based on the report. The micro controller unit 308 may report to the TCU via the CAN that the armature is functioning properly. The micro controller unit 308 may also be configured to determine if the magnet 318, and therefore the armature, fails to move in response to a current through the coil 312. In this case, the micro controller unit 308 may report the malfunction to the TCU via the CAN.

Figure 4:
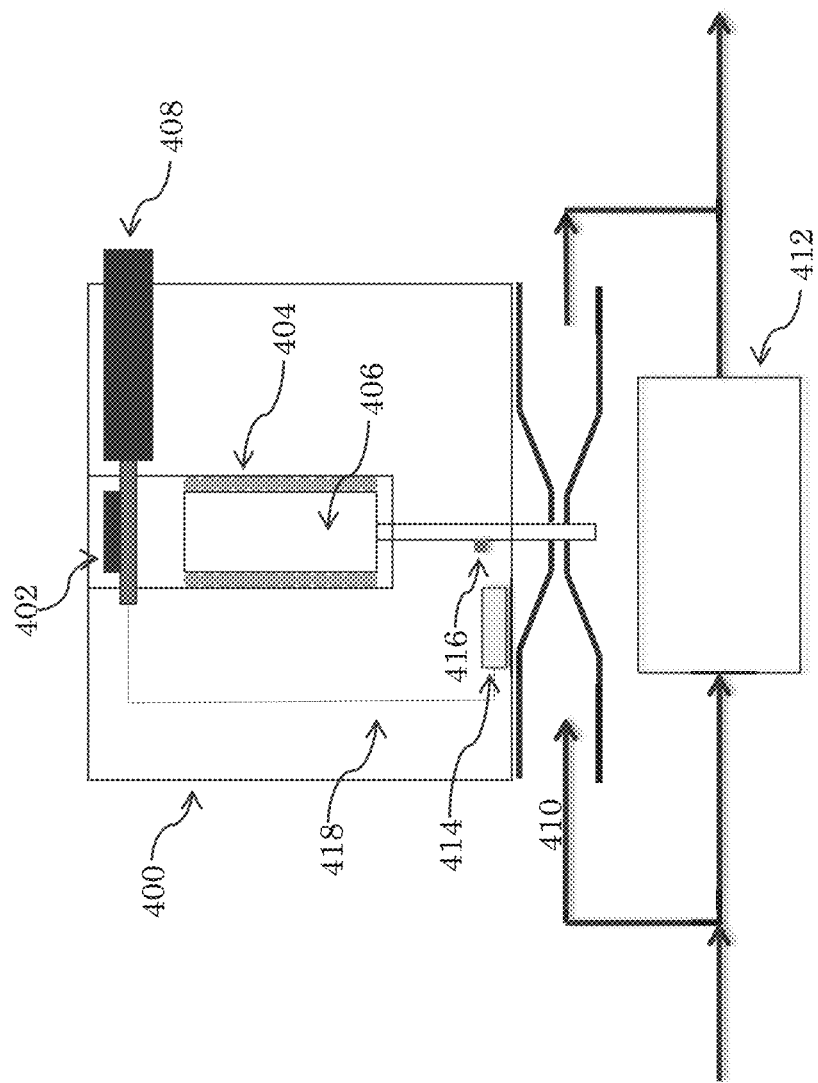
FIG. 4 illustrates a smart solenoid regulating fluid flow.

Referring to FIG. 4, the smart solenoid may comprise a valve housing 400 that encases the control and support electronics 402, the coil 404, and the armature 406. The control and support electronics 402, such as the micro controller unit and the CAN transceiver, may be positioned on a printed circuit board (PCB) substrate. Alternatively, the electronics may be mounted on a flexible circuit. The flexible circuit may be bent or shaped to conform to the shape of the solenoid. The flexible circuit may also be potted or over molded into the solenoid housing. Over molding may protect the part from contamination. A wire harness connector 408 may provide power to the smart solenoid and allow the smart solenoid to communicate with the CAN bus.

Enclosing the control and support electronics 402, coil 404, and armature 406 within the casing 400 simplifies the incorporation of the smart solenoid into an existing device, such as a transmission cooling system. The smart solenoid requires a single connection to the wire harness, reducing the complexity and expense of the wiring. The smart solenoid may also be designed to occupy a minimum amount of space because all of the controls may be mounted on a single circuit board in close proximity to the coil 404 and armature 406.

The smart solenoid may also include an embedded temperature sensor (not shown) on the PCB. The temperature sensor may be used to monitor the temperature of the control and support electronics 402 as well as the temperature of the coil 404 if the PCB is embedded with the coil assembly. The smart solenoid may report information from the embedded temperature sensor, such as the operating temperature of the smart solenoid, to the TCU via the CAN bus.

The smart solenoid may also include an embedded current sense resistor that would allow the micro controller to measure the current flow through the solenoid. This may enable the micro controller to implement a peak and hold algorithm wherein the current supplied to the coil 404 is initially at a maximum value and then is reduced once the fluid that is controlled by the solenoid seals. The peak and hold algorithm may be implemented using a PWM drive to reduce the coil temperature, reduce current consumption, and extend the life of the smart solenoid. The smart solenoid may report information from the embedded temperature sensor to the TCU via the CAN bus. The information may include current consumption, as well as fault information indicating an open coil, shorted coil, etc.

In the example shown in FIG. 4, movement of the armature 406 may open and close a valve that allows the flow 410 of coolant to bypass the radiator 412. When the valve is open, the coolant may bypass the radiator 412, allowing the transmission oil temperature to rise. When the valve is closed, coolant is forced through the radiator 412, thereby lowering the transmission oil temperature. A Hall effect sensor 414 may detect the position of a magnet 416 configured to move with the armature 406. The Hall effect sensor 414 may report the magnet's position to the control and support electronics 402 via wires or a flexible circuit 418.

Figure 5:
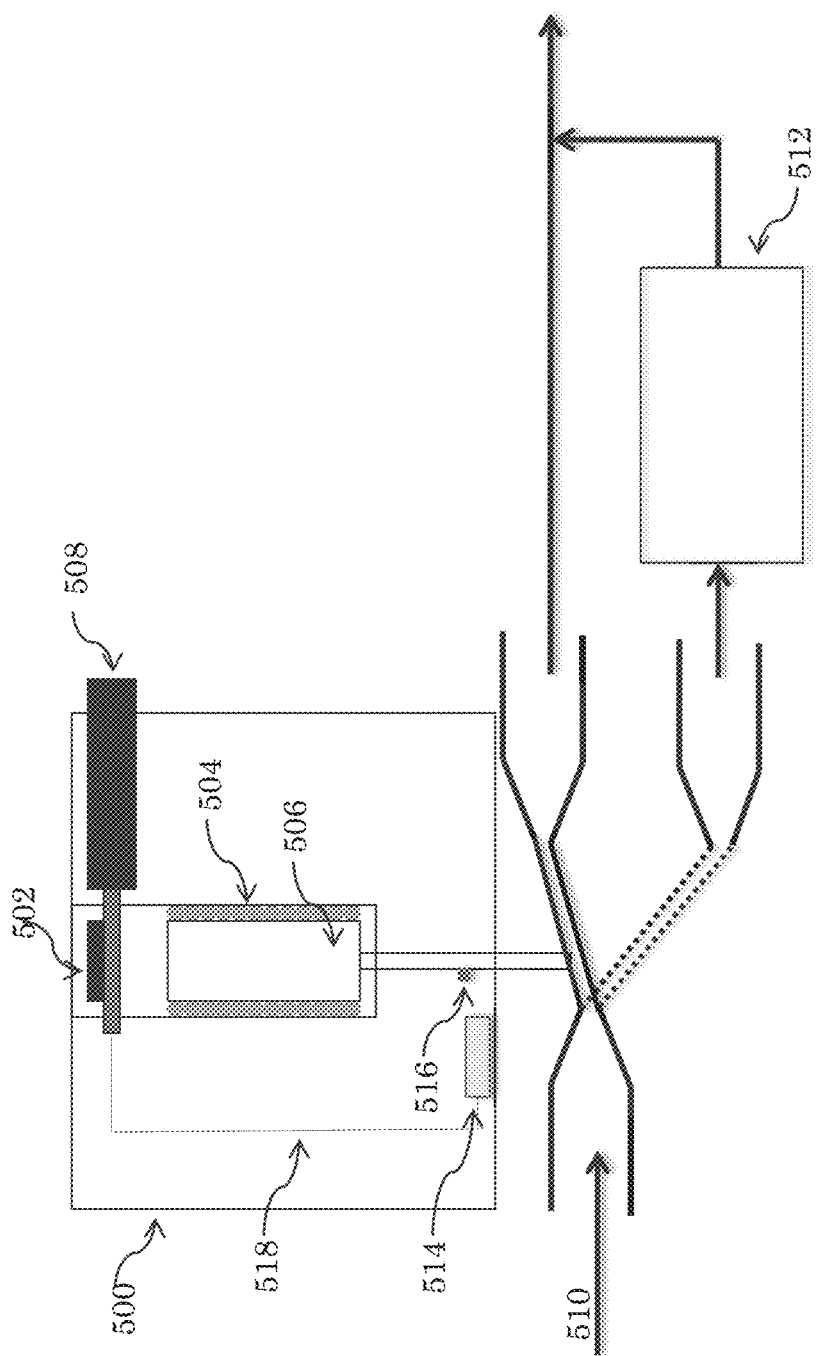
FIG. 5 shows an alternative configuration for regulating fluid flow.

FIG. 5 shows an alternative embodiment, wherein like numbers as in FIG. 4 refer to like elements. When the transmission oil temperature exceeds a certain value, the armature 506 moves to close the upper fluid passage, diverting the flow 510 of coolant to the radiator 512. Once the transmission oil temperature has dropped sufficiently, the upper passage may be re-opened.

Figure 6:
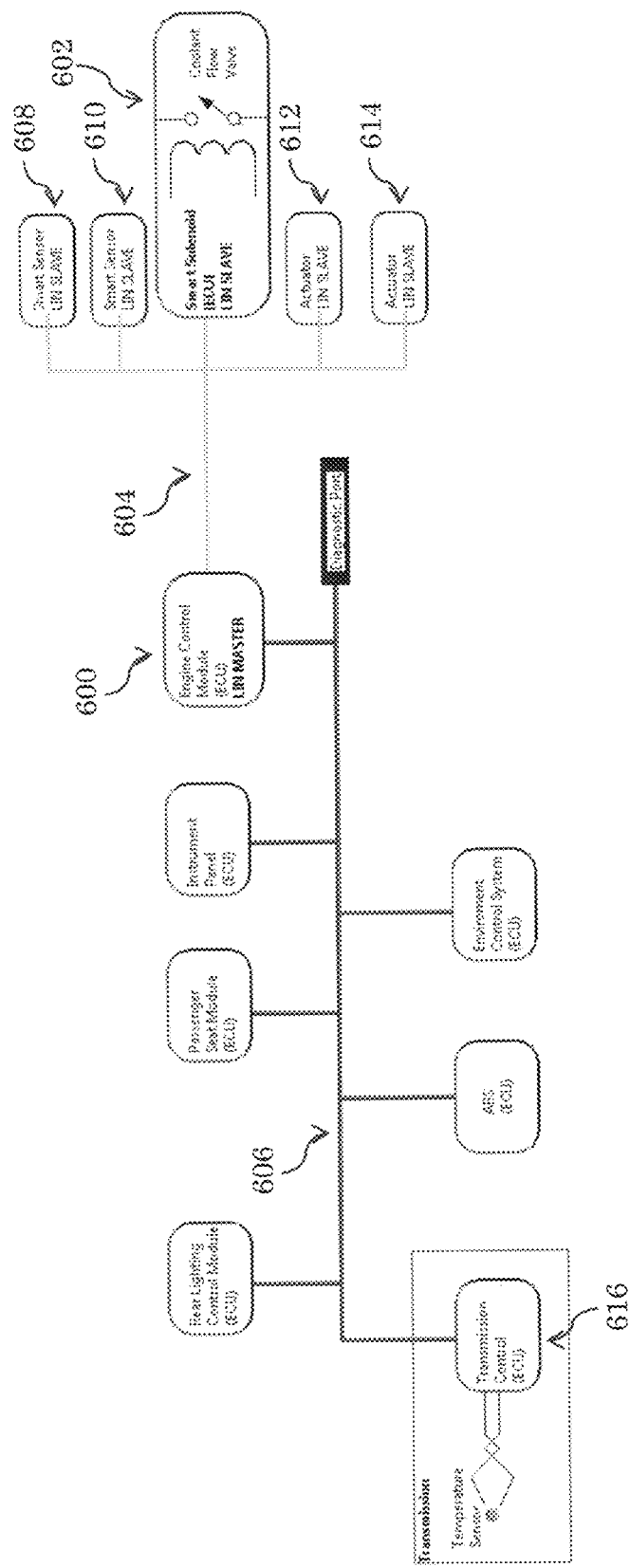
FIG. 6 shows an engine control module connected to a CAN bus, and also connected to a smart solenoid via a local interconnect network (LIN) bus.

In another embodiment, the smart solenoid may be connected to an ECU, for example, the engine control module. If the smart solenoid is located near the radiator and is used to regulate the transmission oil temperature, the engine control module may be in close proximity to it. Referring to FIG. 6, the engine control module 600 may send signals to the smart solenoid 602 via a local interconnect network (LIN) bus 604. The LIN bus 604 may be a low speed bus carrying a lower current than the CAN bus 606. The engine control module 600 may be connected to other devices such as smart sensors 608, 610 and actuators 612, 614 via the LIN bus 604. The engine control module may also be able to communicate with other ECU's via the CAN bus 606, such as the TCU 616.

Figure 7:
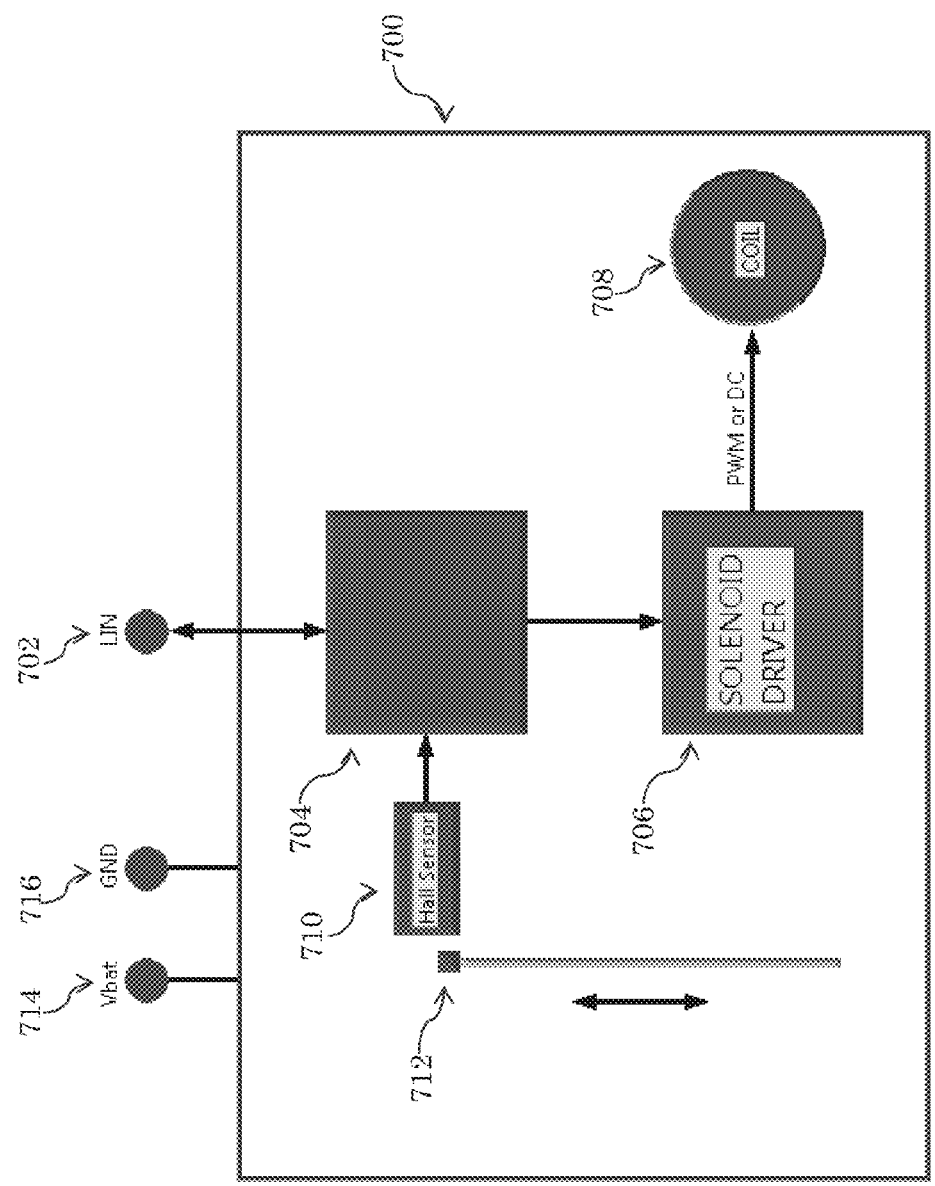
FIG. 7 illustrates a smart solenoid in communication with an engine control module via a LIN communication bus.

Referring to FIG. 7, the smart solenoid 700 may receive and decode signals from the LIN bus 702 at the combination transceiver and micro controller unit 704. The combination transceiver and micro controller unit 704 may be positioned on a printed circuit board (PCB) substrate along with other electronics, such as a micro controller unit 704. Alternatively, the electronics may be mounted on a flexible circuit. The flexible circuit may be bent or shaped to conform to the shape of the solenoid. The flexible circuit may also be potted or over molded into the solenoid housing. Over molding may protect the part from contamination and reduce the operating temperature by enhancing thermal conductivity. The reduction of the operating temperature may extend the lifetime of the smart solenoid.

The combination transceiver and micro controller unit 704 may signal the solenoid driver 706 to energize or de-energize the coil 708 based on the decoded signal. For example, the TCU may send a message over the CAN bus reporting the current transmission control temperature. The engine control module may receive the message and forward it to the smart solenoid 700 via the LIN bus 702. The combination transceiver and micro controller unit 704 may decode the signal and may compare the transmission oil temperature to a predetermined threshold temperature.

If the transmission oil temperature is above the threshold temperature, the combination transceiver and micro controller unit 704 may signal the solenoid driver 706 to energize or de-energize the coil 708. The solenoid driver 706 may send a pulse width modulated (PWM) signal or direct current (DC) signal through the coil 708. The current to the coil 708 may be supplied by the +12V DC and ground terminals 714, 716.

A Hall Effect sensor 710 may detect the position of a magnet 712 connected to the solenoid's armature, and may report the position of the magnet 712 to the combination transceiver and micro controller unit 704. The combination transceiver and micro controller unit 704 may use the magnet's position to determine whether the valve is functioning correctly, and my report its determination to the engine control unit via the LIN bus 702. The engine control unit may then broadcast the information on the CAN bus so that it may be read by the TCU.

The smart solenoid of FIG. 7 may also include an embedded temperature sensor (not shown) on the PCB. The temperature sensor may be used to monitor the temperature of the combination transceiver and micro controller unit 704 and the solenoid driver 706 as well as the temperature of the coil 708 if the PCB is embedded with the coil assembly. The smart solenoid may report information from the embedded temperature sensor, such as the operating temperature of the smart solenoid, to the TCU via the LIN bus.

The smart solenoid may also include an embedded current sense resistor that would allow the micro controller to measure the current flow through the solenoid. This may enable the micro controller to implement a peak and hold algorithm wherein the current supplied to the coil 708 is initially at a maximum value and then is reduced once the fluid that is controlled by the solenoid seals. The peak and hold algorithm may be implemented using a PWM drive to reduce the coil temperature, reduce current consumption, and extend the life of the smart solenoid. The smart solenoid may report information from the embedded temperature sensor to the TCU via the LIN bus. The information may include current consumption, as well as fault information indicating an open coil, shorted coil, etc.

While the smart solenoid is described above as regulating the transmission oil temperature, it may be used as a fluid control valve in any fluid regulated device. The smart solenoid may connected to a control unit via a LIN bus, or may be directly connected to a CAN bus. The smart solenoid is able to receive messages on the CAN bus or LIN bus, and may open and close a fluid control valve based on the received messages.

Because the smart solenoid is able to listen to and decode messages on the CAN bus, it does not need to be directly connected to and controlled by the control unit for the component that it is regulating. In the example above, the smart solenoid regulates the transmission oil temperature, but is not required to be connected to the TCU. Instead, it may listen to the CAN bus, or may listen to a LIN bus of another ECU. This reduces the workload of the ECU that would otherwise be controlling the solenoid fluid control valve.

The smart solenoid can also be easily added to a device with minimal changes to the existing ECUs. For example, the smart solenoid may be used to control the transmission fluid temperature without changing the TCU. No input or output port is required at the TCU, and no signaling or controlling of the smart solenoid by the TCU is needed. The TCU merely broadcasts the transmission oil temperature over the CAN, and the smart solenoid decodes the transmission and energizes or de-energizes the coil accordingly.

While the CAN and LIN buses are two likely interfaces for the smart solenoid, other possibilities include, but are not limited to, FlexRay, Media Oriented Systems Transport (MOST), and Ethernet. A smart solenoid is very flexible and may be designed to interconnect with any vehicle bus type. Although features and elements are described above in particular combinations, one of ordinary skill in the art will appreciate that each feature or element can be used alone or in any combination with the other features and elements.

What is claimed is:
1. A solenoid fluid control valve comprising:
   a transceiver configured to receive a first signal via a controller area network (CAN) bus;

the transceiver further configured to forward the first signal to a micro controller unit;

the micro controller unit configured to decode the first signal received from the transceiver to determine a temperature, and to encode and send a second signal to the transceiver;

the transceiver further configured to broadcast the second signal over the CAN bus;

the micro controller unit further configured to send a third signal to a driver circuit based on the temperature;

the driver circuit configured to send a current through a coil in response to the third signal; and an armature configured to move in response to the current through the coil, wherein the movement of the armature directs a cooling fluid flow.

2. The solenoid fluid control valve of claim 1, wherein the micro controller unit is further configured to compare the temperature to a threshold temperature.

3. The solenoid fluid control valve of claim 2, wherein the micro controller unit is further configured to send to the driver circuit, on a condition that the temperature is greater the threshold temperature, the third signal directing the driver circuit to send a current through the coil that will move the armature to direct the cooling fluid flow through a radiator.

4. The solenoid fluid control valve of claim 2, wherein the micro controller unit is further configured to send to the driver circuit, on a condition that the temperature is less than the threshold temperature, the third signal directing the driver circuit to send a current through the coil that will move the armature to direct the cooling fluid flow to bypass a radiator.

5. The solenoid fluid control valve of claim 1, further comprising:

a magnet positioned to move in response to movement of the armature; and a Hall effect sensor configured to determine a position of the magnet.

6. The solenoid fluid control valve of claim 5, wherein the Hall effect sensor is further configured to send a fourth signal to the micro controller unit indicating the position of the magnet.

7. The solenoid fluid control valve of claim 6, wherein the micro controller unit is further configured to determine whether the solenoid fluid control valve is functioning properly based on the fourth signal indicating the position of the magnet.

8. The solenoid fluid control valve of claim 7, wherein the second signal includes an indication of whether the solenoid is functioning properly.

9. The solenoid fluid control valve of claim 1, wherein the temperature is a transmission fluid temperature.

10. The solenoid fluid control valve of claim 1 further comprising a wire harness connector configured to provide power to the solenoid fluid control valve and enable the solenoid fluid control valve to communicate via the CAN bus.

* * * * *